(12) United States Patent
Kato

(10) Patent No.: US 11,303,776 B2
(45) Date of Patent: Apr. 12, 2022

(54) IMAGE FORMING APPARATUS AND CONTROL METHOD FOR IMAGE FORMING APPARATUS

(71) Applicant: TOSHIBA TEC KABUSHIKI KAISHA, Tokyo (JP)

(72) Inventor: Hiroyuki Kato, Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/245,712

(22) Filed: Apr. 30, 2021

(65) Prior Publication Data
US 2022/0086302 A1 Mar. 17, 2022

(30) Foreign Application Priority Data
Sep. 11, 2020 (JP) .............................. JP2020-152708

(51) Int. Cl.
| | | |
|---|---|---|
| H04N 1/32 | (2006.01) | |
| H04N 1/00 | (2006.01) | |
| G06K 9/00 | (2022.01) | |
| G10L 13/04 | (2013.01) | |
| G10L 13/033 | (2013.01) | |
| H04R 1/02 | (2006.01) | |
| G06F 40/58 | (2020.01) | |

(52) U.S. Cl.
CPC ............... *H04N 1/32* (2013.01); *G06F 40/58* (2020.01); *G06K 9/00463* (2013.01); *G10L 13/033* (2013.01); *G10L 13/04* (2013.01); *H04N 1/00212* (2013.01); *H04N 1/00498* (2013.01); *H04R 1/028* (2013.01); *G06K 2209/01* (2013.01); *H04N 2201/0094* (2013.01)

(58) Field of Classification Search
CPC .. H04N 1/32; H04N 1/00212; H04N 1/00498; H04N 2201/0094; G06F 40/58; G06K 9/00463; G06K 2209/01; G10L 13/033; G10L 13/04; H04R 1/028
USPC ........................................................ 358/1.6
See application file for complete search history.

(56) References Cited

U.S. PATENT DOCUMENTS 8,411,306 B2  4/2013  Yoshida

FOREIGN PATENT DOCUMENTS

| JP | 2007-135110 A | 5/2007 | |
|---|---|---|---|
| JP | 2007-336062 A | 12/2007 | |
| JP | 2021082970 A * | 5/2021 | ........... H04N 1/0097 |

* cited by examiner

*Primary Examiner* — Neil R McLean
(74) *Attorney, Agent, or Firm* — Foley & Lardner LLP

(57) ABSTRACT

An image forming apparatus includes an image forming unit, a machine translation processing unit, a speech synthesis processing unit, and a processor. The image forming unit is configured to print image data. The machine translation processing unit is configured to acquire translated text data as a result of machine translation processing based on untranslated text data generated from a scanned document image. The speech synthesis processing unit is configured to generate speech data based on the translated text data. The processor determines whether to execute printing or generate speech data based on a preset setting of output method, when executing printing, generates translation document image data based on the translated text data and the document image and causes the image forming unit to print the translation document image data, and when generating speech data, causes the speech synthesis processing unit to execute speech synthesis processing.

16 Claims, 10 Drawing Sheets

FIG. 2

Setting of language

| Spanish | English | German | Danish |
| Japanese | Italian | French | Finnish |
| Russian | Polish | Norwegian | Dutch |
| Chinese(T) | Chinese(S) | Turkish | Swedish |

Please select the source language.

Next

FIG. 3

Setting of language

| Spanish | English | German | Danish |
| Japanese | Italian | French | Finnish |
| Russian | Polish | Norwegian | Dutch |
| Chinese(T) | Chinese(S) | Turkish | Swedish |

Please select the translation language.

Back    Next

FIG. 4

Setting of speech production model

| Male | Female | Boy | Girl |

Please select the speech production model.

Back   Next

FIG. 5

```
Setting of output
    Print
            [ Translation language ]

Text to speech
            [ Output by speeker ]   [ Save to memory ]
            [ Transmit by mail ]

Please select the output method.
                                    [ Back ]   [ Next ]
```

FIG. 6

Setting of output

Setting of save file

| Image of document | Translated text |
| --- | --- |
| Speech of translated text | Image of translated document |

Please select the save file.

| Back | Next |

FIG. 7

Setting of output
  Setting of transmission of mail

| Image of document | Translated text |
| Speech of translated text | Image of translated document |

Please select the file to attach.

[                                              ]

Please input the Email address.

| Back | Next |

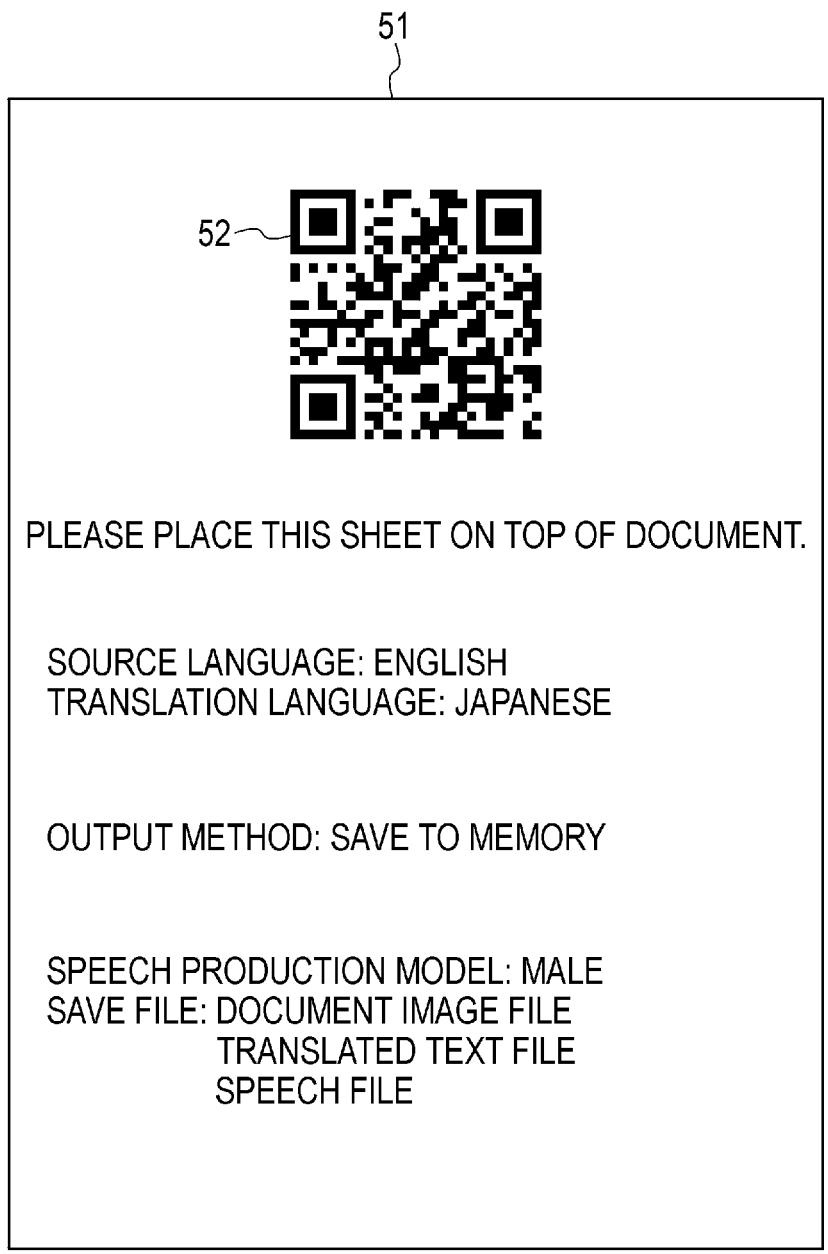

IMAGE FORMING APPARATUS AND CONTROL METHOD FOR IMAGE FORMING APPARATUS

CROSS-REFERENCE TO RELATED APPLICATION

This application is based upon and claims the benefit of priority from Japanese Patent Application No. 2020-152708, filed on Sep. 11, 2020, the entire contents of which are incorporated herein by reference.

FIELD

Embodiments described herein relate generally to an image forming apparatus and a control method for the image forming apparatus.

BACKGROUND

An image forming apparatus executes printing in response to a printing request. In the image forming apparatus, a sheet such as paper is conveyed, an image is formed on the sheet, and the sheet on which the image is formed is discharged. In addition, the image forming apparatus can generate image data by reading a sheet (document).

Additionally, the image forming apparatus includes applications that execute various kinds of processing based on the acquired image data. For example, the image forming apparatus may include an application that executes optical character recognition (OCR) processing of recognizing characters from the image data of the document to acquire text data. Additionally, for example, the image forming apparatus may include an application that executes machine translation processing of translating the text data into any language.

DESCRIPTION OF THE DRAWINGS

FIG. 2 is a diagram illustrating an example of an operation of the image forming apparatus;

FIG. 3 is a diagram illustrating an example of the operation of the image forming apparatus;

FIG. 4 is a diagram illustrating a display example of a screen of the image forming apparatus;

FIG. 5 is a diagram illustrating a display example of the screen of the image forming apparatus;

FIG. 6 is a diagram illustrating a display example of the screen of the image forming apparatus;

FIG. 7 is a diagram illustrating a display example of the screen of the image forming apparatus;

FIG. 10 is a diagram illustrating an example in which a setting for the image forming apparatus is stored to a recording medium.

DETAILED DESCRIPTION

An image forming apparatus as described above can execute translation copy printing of printing the result of the machine translation processing on a medium (for example, a paper medium) as the translation result and outputting the medium. However, there is a problem in that an output method of the translation result is limited to the printing on a paper medium.

Embodiments described herein provide an image forming apparatus having high convenience and a control method for the image forming apparatus.

In general, according to at least one embodiment, there is provided an image forming apparatus including an image forming unit (image former), a machine translation processing unit (translation processor), a speech synthesis processing unit (speech synthesis processor or speech synthesizer), and a processor. The image forming unit is configured to print image data on a medium. The machine translation processing unit is configured to acquire translated text data as a result of machine translation processing based on untranslated text data that is generated from a scanned document image through OCR processing. The speech synthesis processing unit is configured to generate speech data based on the translated text data. The processor determines whether to execute printing or to generate speech data based on a preset setting of output method, when executing printing, generates translation document image data based on the translated text data and the document image and causes the image forming unit to print the translation document image data, and when generating speech data, causes the speech synthesis processing unit to execute speech synthesis processing of generating speech data based on the translated text data.

Hereinafter, an embodiment will be described with reference to the drawings.

Figure 1:
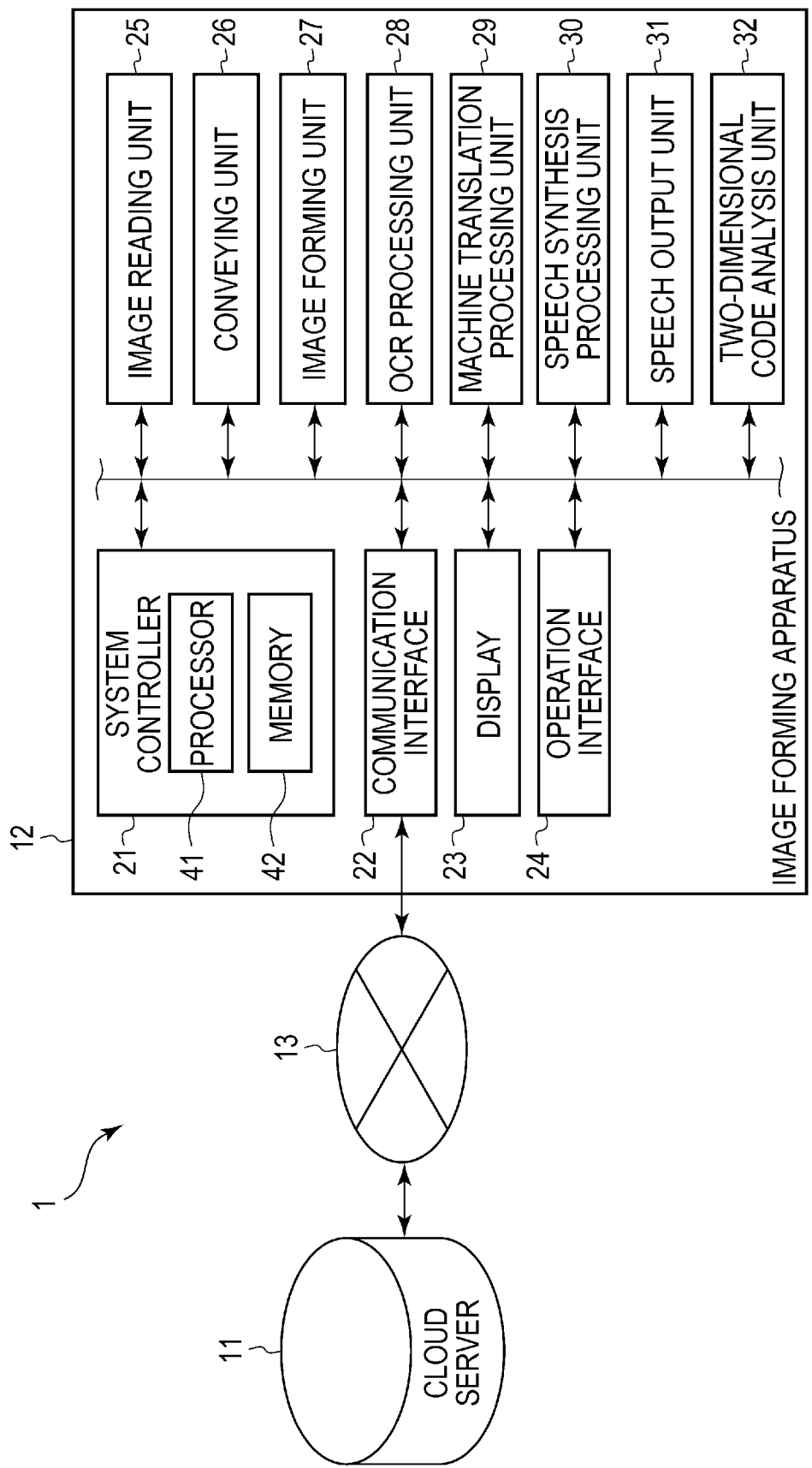
FIG. 1 is a diagram illustrating a configuration example of an image forming apparatus according to at least one embodiment.

FIG. 1 is a diagram illustrating a configuration example of an image forming system 1 according to at least one embodiment.

The image forming system 1 includes a cloud server 11 and an image forming apparatus 12. The cloud server 11 and the image forming apparatus 12 are connected via a network 13 such as a public line. In the image forming system 1, the image forming apparatus 12 transmits data to the cloud server 11, and the cloud server 11 executes processing based on the received data and transmits the processing result to the image forming apparatus 12.

According to at least one embodiment, it is assumed that, in the image forming system 1, the image forming apparatus 12 transmits text data to the cloud server 11, and the cloud server executes machine translation processing based on the received text data.

The cloud server 11 is a server apparatus including a processor, a memory, and a communication interface. The cloud server 11 executes the machine translation processing by the processor executing a program of the memory. For example, when text data (untranslated text data) that is not yet translated is received from the image forming apparatus 12, the cloud server 11 executes the machine translation processing using a preset language dictionary and generates text data (translated text data) of a given language. The cloud server 11 transmits the generated translated text data to the image forming apparatus 12.

The image forming apparatus 12 is, for example, a multi-function peripheral (MFP) that executes various processes such as an image forming process while conveying a recording medium such as a printing medium. The image forming apparatus 12 has a configuration in which an image is formed on a printing medium using toner supplied from a toner cartridge. In addition, the image forming apparatus 12 is configured to read an image from a printing medium (document) on which the image is printed.

The image forming apparatus 12 is, for example, a multi-function printer (MFP) that executes various processes such as an image forming process while conveying a recording medium such as a printing medium. The image forming apparatus 12 is, for example, a solid-state scanning type printer (for example, an LED printer) that scans an LED array to execute various processes such as an image forming process while conveying a recording medium such as a printing medium. In addition, the image forming apparatus 12 is an ink jet type printer (ink jet printer) that scans an ink jet head ejecting ink or another type of printer.

The image forming apparatus 12 charges a photosensitive drum and irradiates the photosensitive drum with light corresponding to image data for printing to form an electrostatic latent image on the photosensitive drum. The image forming apparatus 12 attaches toner to the latent image formed on the photosensitive drum and transfers the toner attached to the latent image to a printing medium to form a toner image on the printing medium. In addition, the image forming apparatus 12 applies heat and pressure to the printing medium to which the toner image is transferred such that the toner image is fixed to the printing medium.

The image forming apparatus 12 includes a system controller 21, a communication interface 22, a display 23, an operation interface 24, an image reading unit 25, a conveying unit 26, an image forming unit 27, an OCR processing unit 28, a machine translation processing unit 29, a speech synthesis processing unit 30, a speech output unit 31, and a two-dimensional code analysis unit 32. The system controller 21, the communication interface 22, the display 23, the operation interface 24, the image reading unit 25, the conveying unit 26, the image forming unit 27, the OCR processing unit 28, the machine translation processing unit 29, the speech synthesis processing unit 30, the speech output unit 31, and the two-dimensional code analysis unit 32 are accommodated in a housing (not illustrated).

The system controller 21 controls the image forming apparatus 12. The system controller 21 includes, for example, a processor 41 and a memory 42.

The processor 41 is an arithmetic element (for example, CPU) that executes arithmetic processing. The processor 41 is a main body of the operation of the system controller 21. The processor 41 executes various processes based on data such as programs stored in the memory 42. The processor 41 functions as a control unit that can execute various operations by executing the programs stored in the memory 42.

The memory 42 is a storage device that stores the programs and the data used in the programs. In addition, the memory 42 temporarily stores data or the like that is being processed by the processor 41. The memory 42 is configured as a nonvolatile memory.

The communication interface 22 is an interface that relays communication with a client device or the like supplying a print job via a network. In addition, the communication interface 22 relays communication between a recording medium (for example, a USB memory) for storing data and the system controller.

The display 23 displays a screen based on a video signal input from the system controller 21 or a display control unit such as a graphic controller (not illustrated). For example, the display 23 displays a screen for various settings of the image forming apparatus 12.

The operation interface 24 includes various operation members. The operation interface 24 supplies an operation signal corresponding to the operation of the operation member to the system controller 21. The operation member is, for example, a touch sensor, a numeric keypad, a power key, a paper feed key, various function keys, or a keyboard. The touch sensor is, for example, a resistive touch sensor ora capacitive touch sensor. The touch sensor acquires information representing a position designated in certain region. The touch sensor is configured as a touch panel integrated with the display 23 such that a signal representing a position that is touched on a screen displayed by the display 23 is input to the system controller 21.

The image reading unit 25 is configured to read an image from a document. The image reading unit 25 includes, for example, a scanner and an automatic document feeder (ADF). The scanner reads a document from a side of a glass plate facing the document, the document being placed on the glass plate. The image reading unit 25 acquires an image of the entire document, for example, by acquiring the image with the scanner while conveying the scanner. In addition, the image reading unit 25 acquires an image of the entire document, for example, by acquiring the image with the scanner while causing the ADF to feed the document to pass through a reading position of the scanner. That is, the image reading unit 25 scans the document to generate an electronic file and acquires data of the document image.

The conveying unit 26 is configured to supply a medium for printing (printing medium) to the image forming unit 27 and to discharge the printing medium on which an image is formed by the image forming unit 27 from the housing. The conveying unit 26 supplies printing media accommodated in a paper feed cassette (not illustrated) to the image forming unit 27 one by one, the paper feed cassette accommodating the printing media. In addition, the conveying unit 26 discharges the printing medium on which an image is formed by the image forming unit 27 to a paper discharge tray outside the housing.

The image forming unit 27 forms an image on the printing medium under the control of the system controller 21. The image forming unit 27 includes a process unit, an exposure unit, a transfer mechanism, and a fixing unit. The image forming unit 27 includes the process unit and the exposure unit per toner color. The toner colors include, for example, cyan (C), magenta (M), yellow (Y), and black (K). The image forming unit 27 forms a color image on the medium by fixing the toner images of the respective colors CMYK to the medium.

The process unit includes a photosensitive drum, an electrostatic charger, and a developing unit.

The photosensitive drum is a photoreceptor including: a cylindrical drum; and a photosensitive layer that is formed on an outer circumferential surface of the drum. The photosensitive drum is rotated by a driving mechanism (not illustrated) at a constant speed.

The electrostatic charger uniformly charges a surface of the photosensitive drum. For example, the electrostatic charger applies a voltage to the photosensitive drum using a charging roller such that the photosensitive drum is uniformly charged to a potential having a negative polarity.

The developing unit attaches the toner to the photosensitive drum. The developing unit includes, for example, a developer container, an agitating mechanism, a developing roller, and a doctor blade.

The developer container receives and contains the toner supplied from the toner cartridge. The developer container contains a carrier in advance. The toner supplied from the toner cartridge is agitated by the agitating mechanism together with the carrier to form a developer in which the toner and the carrier are mixed. The carrier is contained in the developer container during manufacturing of the developing unit.

The developing roller rotates in the developer container such that the developer is attached to the surface. The doctor blade is a member disposed at a predetermined distance from the surface of the developing roller. The doctor blade removes a part of the developer attached to the surface of the rotating developing roller. As a result, a layer of the developer having a thickness corresponding to the distance between the doctor blade and the surface of the developing roller is formed on the surface of the developing roller.

The exposure unit includes a plurality of light emitting elements. The exposure unit forms a latent image on the photosensitive drum by irradiating the charged photosensitive drum with light from the light emitting elements. The light emitting element is, for example, a light emitting diode (LED). One light emitting element is configured to irradiate one point on the photosensitive drum with light. The light emitting elements are arranged in a main scanning direction that is a direction parallel to a rotation axis of the photosensitive drum.

The exposure unit forms a latent image corresponding to one line on the photosensitive drum by irradiating the photosensitive drum with light from the light emitting elements arranged in the main scanning direction. Further, the exposure unit forms a latent image corresponding to a plurality of lines by continuously irradiating the rotating photosensitive drum with light.

In the above-described configuration, when the surface of the photosensitive drum charged by the electrostatic charger is irradiated with light from the exposure unit, an electrostatic latent image is formed. When the layer of the developer formed on the surface of the developing roller approaches the surface of the photosensitive drum, the toner in the developer is attached to the latent image formed on the surface of the photosensitive drum. As a result, a toner image is formed on the surface of the photosensitive drum.

The transfer mechanism is configured to transfer the toner image formed on the surface of the photosensitive drum to the printing medium. The transfer mechanism includes a primary transfer belt, a secondary transfer roller, and a plurality of rollers. The transfer mechanism receives the toner image formed on the surface of the photosensitive drum on an outer circumferential surface of the primary transfer belt. The transfer mechanism conveys the toner image on the outer circumferential surface of the primary transfer belt up to a transfer nip where the secondary transfer roller and the outer circumferential surface of the primary transfer belt are in close contact with each other. The transfer mechanism transfers the toner image on the outer circumferential surface of the primary transfer belt to the printing medium by allowing the printing medium supplied by the conveying unit 26 to pass through the transfer nip.

The fixing unit is configured to fix the toner image transferred to the printing medium to the printing medium. The fixing unit includes: a heating member (heating roller) that applies heat to the printing medium; a pressurizing member (press roller) that applies pressure to the printing medium; and a heater that heats the heating roller. The press roller applies pressure to the heating roller to form a fixing nip where the press roller and the heating roller are in close contact with each other. The fixing unit applies heat and pressure to the printing medium by allowing the printing medium to which the toner image is transferred by the transfer mechanism to pass through the fixing nip. As a result, the fixing unit fixes the toner image formed on the printing medium. The printing medium that passes the fixing nip is discharged to the paper discharge tray by the conveying unit 26.

The OCR processing unit 28 is configured to execute OCR processing. The OCR processing unit 28 may be incorporated into the image forming apparatus 12 as hardware for executing the OCR processing, or may be incorporated into the image forming apparatus 12 as a program that is stored in the memory 42 and is executed by the processor 41.

The OCR processing unit 28 executes the OCR processing on the document image acquired by the image reading unit 25 to acquire (or to generate) text data (untranslated text data). The OCR processing unit 28 determines a language to be recognized as a text based on a setting of language described below.

The machine translation processing unit 29 is configured to execute machine translation processing. The machine translation processing unit 29 may be incorporated into the image forming apparatus 12 as hardware for executing the machine translation processing using a language dictionary stored in a storage (not illustrated) or the like in advance. In addition, the machine translation processing unit 29 may be incorporated into the image forming apparatus 12 as a program that is executed by the processor 41 in a form where it is stored in the memory 42. In addition, the machine translation processing unit 29 may be configured to transmit and receive data to and from the cloud server 11 to allow the cloud server 11 to execute the machine translation processing.

The machine translation processing unit 29 acquires (or generates) text data (translated text data) that is translated from the untranslated text data through the machine translation processing. The machine translation processing unit 29 acquires the translated text data (text data of a translation language) from the untranslated text data (text data of a source language) based on the setting of language described below.

The speech synthesis processing unit 30 is configured to execute speech synthesis processing. The speech synthesis processing unit 30 may be incorporated into the image forming apparatus 12 as hardware for executing the speech synthesis processing (text to speech: TTS), or may be incorporated into the image forming apparatus 12 as a program that is stored in the memory 42 and is executed by the processor 41.

The speech synthesis processing unit 30 generates speech data from the text data through the speech synthesis processing. The speech data is generated based on, for example, various speech production models such as a male model or a female model. The speech synthesis processing unit 30 determines a speech production model used for generating the speech data based on a setting of speech production model described below.

The speech output unit 31 is configured to output a speech. The speech output unit 31 is, for example, a speaker. The speech output unit 31 outputs a speech based on the speech data.

The two-dimensional code analysis unit 32 is configured to analyze (decode) a two-dimensional code such as a QR code (registered trade name). The two-dimensional code analysis unit 32 may be incorporated into the image forming apparatus 12 as hardware for decoding the two-dimensional code, or may be incorporated into the image forming apparatus 12 as a program that is stored in the memory 42 and is executed by the processor 41. The two-dimensional code analysis unit 32 decodes the two-dimensional code to acquire original data.

Next, various settings for the image forming apparatus will be described.

The processor 41 of the system controller 21 stores various settings relating to the OCR processing, the machine translation processing, the speech synthesis processing, the output method of the processing result, and the like in the memory 42. Specifically, the settings stored in the memory 42 include "setting of language", "setting of speech production model", and "setting of output method".

FIGS. 2 and 3 are diagrams illustrating an example of a screen for setting "setting of language" in at least one embodiment.

"Setting of language" represents "source language" and "translation language". "Source language" represents a language to be recognized as text data in the OCR processing. In addition, "source language" represents a language of the untranslated text data in the machine translation processing. "Translation language" represents a language of the translated text data in the machine translation processing.

That is, the OCR processing unit 28 determines a language to be recognized as text data based on "source language" in "setting of language".

In addition, the machine translation processing unit 29 determines languages to be used for the machine translation based on "source language" and "translation language" in "setting of language".

The processor 41 causes the display 23 to display a screen for setting the source language illustrated in FIG. 2 based on a predetermined operation. The screen for setting the source language includes a menu display for selecting the source language. The processor 41 sets "source language" depending on the selection of the language on the screen.

In addition, the processor 41 causes the display 23 to display a screen for setting the translation language illustrated in FIG. 3 based on a predetermined operation. The screen for setting the translation language includes a menu display for selecting the translation language. The processor 41 sets "translation language" depending on the selection of the language on the screen. The processor 41 may be configured to set a plurality of languages as "translation language".

FIG. 4 is a diagram illustrating an example of a screen for setting "setting of speech production model".

"Setting of speech production model" represents a speech production model used for the speech synthesis processing.

That is, the speech synthesis processing unit 30 determines a speech production model used for generating the speech data based on "setting of speech production model".

The processor 41 causes the display 23 to display a screen for setting the speech production model illustrated in FIG. 4 based on a predetermined operation. The screen for setting the speech production model includes a menu display for selecting the speech production model. The processor 41 sets "setting of speech production model" depending on the selection of the speech production model on the screen. The processor 41 may be configured to set a plurality of speech production models as "setting of speech production model".

FIG. 5 is a diagram illustrating an example of a screen for setting "setting of output method".

"Setting of output method" represents an output method of the translation result. Examples of the output method of the translation result in the image forming apparatus 12 according to the embodiment include "printing (translation copy printing)", "speech synthesis (output by speaker)", "speech synthesis (store to recording medium)", and "speech synthesis (transmit by e-mail)".

When executing "printing (translation copy printing)", the processor 41 generates the translation document image data based on the document image and the result of machine translation processing (translated text data). The processor 41 controls the conveying unit 26 and the image forming unit 27 such that printing is executed on the medium based on the translation document image data.

The translation document image data is an image in which the translated text data is superimposed on the document image. The processor 41 specifies a position where the translated text data is superimposed on the document image based on the result of OCR processing. As a result, the processor 41 generates translation document image data in which characters on the document image are replaced with the translated text data.

When executing "speech synthesis (output by speaker)", the processor 41 controls the speech synthesis processing unit such that the speech synthesis processing based on the translated text data is executed using the speech production model represented by "setting of speech production model". The processor 41 controls the speech output unit such that the generated speech data is output from the speaker.

When executing "speech synthesis (store to recording medium)", the processor 41 controls the speech synthesis processing unit such that the speech synthesis processing based on the translated text data is executed using the speech production model represented by "setting of speech production model". The processor 41 stores the generated speech data to a recording medium via the communication interface 22.

When executing "speech synthesis (transmit by e-mail)", the processor 41 controls the speech synthesis processing unit such that the speech synthesis processing based on the translated text data is executed using the speech production model represented by "setting of speech production model". The processor 41 transmits an e-mail to which the generated speech data to a recording medium is attached via the communication interface 22.

The processor 41 causes the display 23 to display a screen for setting the output method illustrated in FIG. 5 based on a predetermined operation. The screen for setting the output method includes a menu display for selecting the output method among "printing (translation copy printing)", "speech synthesis (output by speaker)", "speech synthesis (store to recording medium)", and "speech synthesis (transmit by e-mail)". The processor 41 sets "setting of output method" depending on the selection of the output method on the screen. The processor 41 may be configured to set a plurality of output methods as "setting of output method". In addition, the processor 41 may be configured to select an output method such as Braille output based on the translated text data or output as sign language animation that is automatically generated based on the translated text data in addition to the example illustrated in FIG. 5.

In addition, in FIG. 5, when "speech synthesis (store to recording medium)" is selected, the processor 41 causes the display 23 to display a screen for selecting data to be stored as illustrated in FIG. 6. The screen of FIG. 6 includes a menu display for selecting the data to be stored among "document image (document image data)", "translated text data", "speech data", and "translation document image data". The processor 41 sets the data to be stored depending on the selection on the screen. The processor 41 may be configured to set a plurality of data as the data to be stored.

In addition, in FIG. 5, when "speech synthesis (transmit by e-mail)" is selected, the processor 41 causes the display 23 to display a screen for selecting data to be attached to the e-mail and inputting an e-mail address as illustrated in FIG. 7. The screen of FIG. 7 includes a menu display for selecting the data to be attached to the e-mail among "document image (document image data)", "translated text data", "speech data", and "translation document image data," for example. The processor 41 sets the data to be attached to the e-mail depending on the selection on the screen. The processor 41 may be configured to set a plurality of data as the data to be attached to the e-mail.

The data to be stored to the recording medium and the data to be attached to the e-mail are not limited to "document image (document image data)", "translated text data", "speech data", and "translation document image data". Further, various data may be selected. For example, the processor 41 may be configured to select a multimedia file generated by combining the translation document image data and the speech data.

Next, the flow of the machine translation processing in the image forming apparatus 12 will be described.

Figure 8:
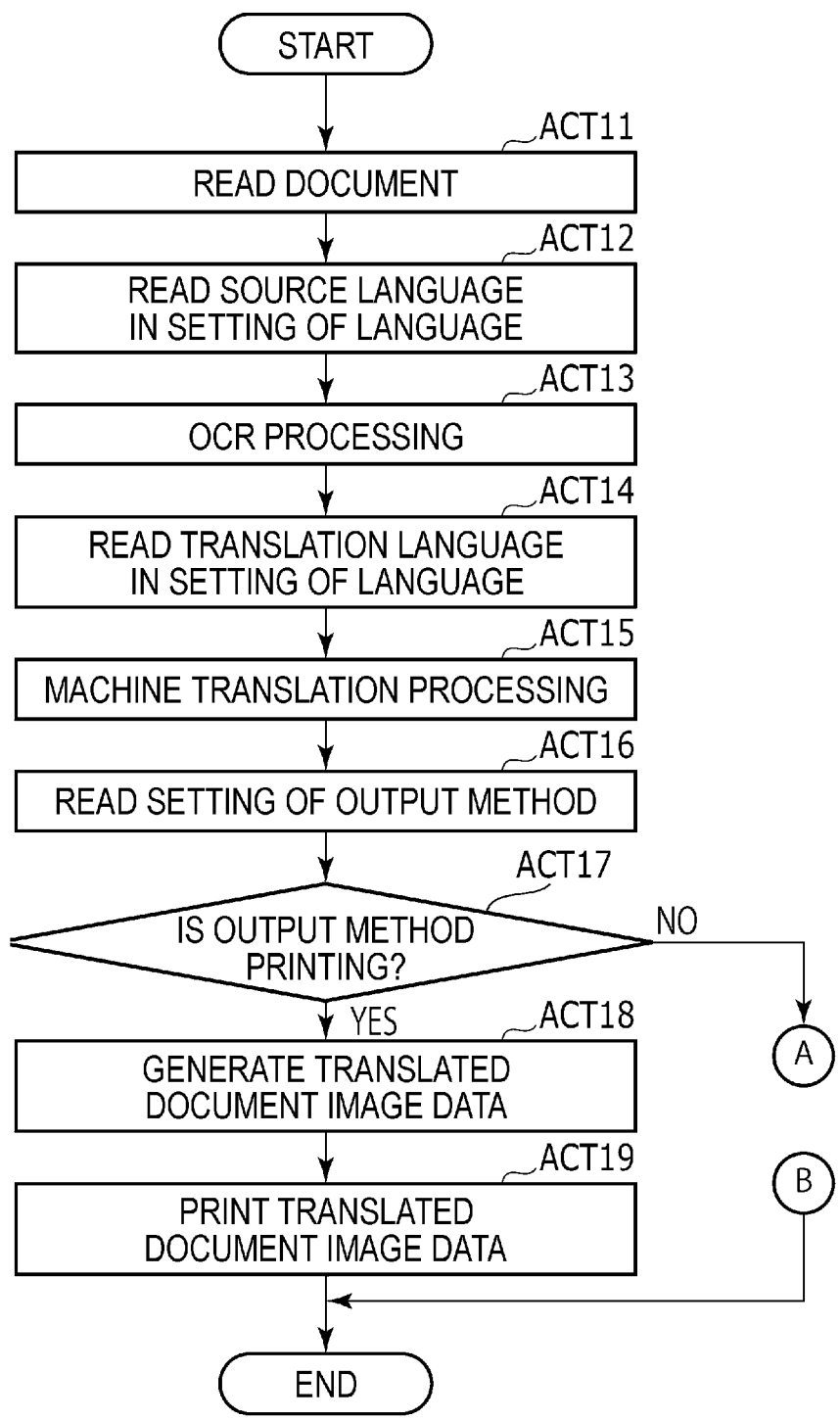
FIG. 8 is a diagram illustrating a display example of the screen of the image forming apparatus.
Figure 9:
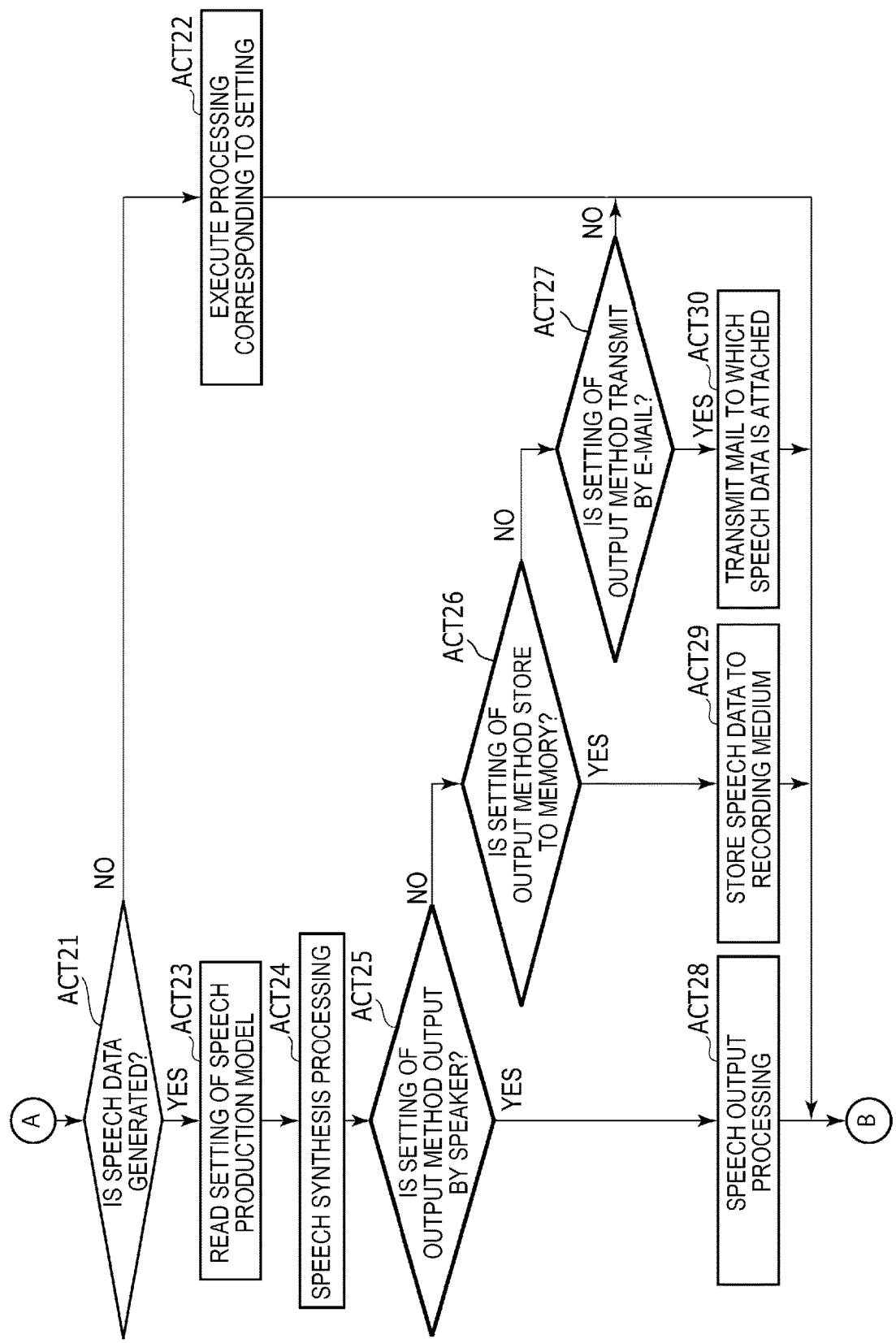
FIG. 9 is a diagram illustrating a display example of the screen of the image forming apparatus.

FIGS. 8 and 9 are flowcharts illustrating the machine translation processing in the image forming apparatus 12. In the following description of this example, it is assumed that a document is read, the machine translation is executed in the image forming apparatus 12, and the result of machine translation is output. In addition, in the following description, it is assumed that "setting of language", "setting of speech production model", and "setting of output method" are set in advance. However, settings such as "setting of language", "setting of speech production model", and "setting of output method" may be set whenever the machine translation processing illustrated in FIGS. 8 and 9 are executed, in at least one embodiment.

The image reading unit 25 reads a document and acquires document image data (ACT 11).

The OCR processing unit 28 reads "source language" in "setting of language" (ACT 12). The OCR processing unit 28 executes the OCR processing (ACT 13). As a result, the OCR processing unit 28 acquires untranslated text data of "source language".

The machine translation processing unit 29 reads "source language" and "translation language" in "setting of language" (ACT 14). The machine translation processing unit 29 executes the machine translation processing on the untranslated text data using a language dictionary stored in a storage device (not illustrated) (ACT 15). That is, the machine translation processing unit 29 generates translated text data as text data of the language represented by "translation language" from the untranslated text data.

The machine translation processing unit 29 may be configured to determine "source language" from the untranslated text data instead of reading "source language" in "setting of language".

The processor 41 reads "setting of output method" (ACT 16). The processor 41 determines whether or not the output method represented by "setting of output method" is "printing (translation copy printing)" (ACT 17).

When the processor 41 determines that the output method represented by "setting of output method" is "printing (translation copy printing)" (ACT 17, YES), the processor 41 generates translation document image data (ACT 18). That is, the processor 41 superimposes the translated text data on the document image to generate translation document image data.

The processor 41 controls the image forming unit 27 such that the translation document image data is printed on a medium (ACT 19) and ends the process of FIG. 8.

When the processor 41 determines that the output method represented by "setting of output method" is not "printing (translation copy printing)" in ACT 17 (ACT 17, NO), the processor 41 shifts to the process of ACT 21 in FIG. 9. The processor 41 determines whether or not to generate speech data, that is, whether or not to execute the speech synthesis processing (ACT 21). When the output method represented by "setting of output method" is any one of "speech synthesis (output by speaker)", "speech synthesis (store to recording medium")", and "speech synthesis (transmit by e-mail)", the processor 41 determines to generate speech data.

When the processor 41 determines not to generate speech data (ACT 21, NO), the processor 41 executes the processing using an output method corresponding to the setting of the output method (ACT 22). That is, the processor 41 outputs the translation result using the multimedia file generation method, the Braille output method, or another method, and ends the processes of FIGS. 8 and 9.

When the processor 41 determines to generate speech data (ACT 21, YES), the processor 41 reads "setting of speech production model" (ACT 23). The processor 41 controls the speech synthesis processing unit 30 such that the speech synthesis processing is executed based on the read "setting of speech production model" and the translated text data generated in ACT 15 (ACT 24). As a result, the speech synthesis processing unit 30 generates speech data corresponding to the translated text data.

Next, the processor 41 determines whether or not "setting of output method" represents "speech synthesis (output by speaker)" (ACT 25), determines whether or not "setting of output method" represents "speech synthesis (store to recording medium)" (ACT 26), and determines whether or not "setting of output method" represents "speech synthesis (transmit by e-mail)" (ACT 27).

When the processor 41 determines that "setting of output method" represents "speech synthesis (output by speaker)" (ACT 25, YES), the processor 41 controls the speech output unit 31 such that speech output processing is executed based on the speech data generated in ACT 24 (ACT 28).

In addition, when the processor 41 determines that "setting of output method" represents "speech synthesis (store to recording medium)" (ACT 26, YES), the processor 41 stores the speech data generated in ACT 24 to a recording medium (ACT 29). The processor 41 may store not only the speech data but also "document image (document image data)", "translated text data", and the like to the recording medium at the same time in accordance with the setting of FIG. 6.

In addition, when "translation document image data" is selected as the data to be stored to the recording medium, the processor 41 may generate translation document image data and may also store the generated translation document image data to the recording medium at the same time.

In addition, when the processor 41 determines that "setting of output method" represents "speech synthesis (transmit by e-mail)" (ACT 27, YES), the processor 41 transmits an e-mail to which the speech data generated in ACT 24 is attached (ACT 30). The processor 41 determines an e-mail address in accordance with setting of FIG. 7. In addition, the processor 41 may attach not only the speech data but also "document image (document image data)", "translated text data", and the like to the e-mail at the same time in accordance with the setting of FIG. 7.

In addition, when "translation document image data" is selected as the data to be attached to the e-mail, the processor 41 may generate translation document image data and may also attach the generated translation document image data to the e-mail at the same time.

As described above, the processor of the image forming apparatus 12 determines whether to execute printing or to generate speech data based on a preset setting of output method. When executing printing, the processor 41 generates translation document image data based on the translated text data and the document image and causes the image forming unit 27 to print the translation document image data. In addition, when generating speech data, the processor 41 causes the speech synthesis processing unit 30 to execute speech synthesis processing of generating speech data based on the translated text data. As a result, the image forming apparatus 12 can select whether to execute printing or to generate speech data based on the translation result of the document on which the OCR processing is executed. As a result, the convenience of the image forming apparatus 12 can be improved.

Further, the processor 41 can select whether to output a speech based on the generated speech data, to store the generated speech data to a recording medium, or to transmit the generated speech data by e-mail. As a result, the image forming apparatus 12 can output the translation result using various methods.

In the description of the embodiment, various settings (for example, "setting of language", "setting of speech production model", and "setting of output method") are set in advance in the image forming apparatus 12 or are set whenever the machine translation processing is executed. However, the embodiments are not limited to this configuration. The image forming apparatus 12 may be configured to store the settings such as "setting of language", "setting of speech production model", and "setting of output method" to a recording medium. In addition, the image forming apparatus 12 may be configured to set "setting of language", "setting of speech production model", "setting of output method", and the like based on information read from the recording medium.

Specifically, the processor 41 of the image forming apparatus 12 generates the two-dimensional code based on "setting of language", "setting of speech production model", and "setting of output method" that are set in advance. Further, the processor 41 controls the image forming unit 27 such that the two-dimensional code is printed on a paper medium. As a result, a setting sheet 51 illustrated in FIG. 10 is output from the image forming apparatus 12.

A two-dimensional code 52 and a character string representing the setting details are printed on the setting sheet 51. The two-dimensional code 52 is converted from information including "setting of language", "setting of speech production model", "setting of output method", and the like. The character string represents "setting of language", "setting of speech production model", and "setting of output method". For example, by reading the setting sheet 51 together with a document when the processes of FIGS. 8 and 9 are executed, "setting of language", "setting of speech production model", and "setting of output method" can be designated in the image forming apparatus 12.

That is, when the setting sheet 51 is included in the read document, the processor 41 specifies the two-dimensional code 52 from the image including the setting sheet 51 that is read by the image reading unit 25. The processor 41 causes the two-dimensional code analysis unit 32 to decode the two-dimensional code 52 and acquires information regarding "setting of language", "setting of speech production model", and "setting of output method". The processor 41 executes the OCR processing, the machine translation processing, the printing processing, and the speech synthesis processing based on the acquired "setting of language", "setting of speech production model", and "setting of output method" and the document image read by the image reading unit 25.

As a result, the image forming apparatus 12 can execute the OCR processing, the machine translation processing, the printing processing, and the speech synthesis processing at given settings by manually setting the settings for each processing. As a result, the convenience of the image forming apparatus 12 can be further improved.

The two-dimensional code 52 may be configured to include identification information instead of including the settings such as "setting of language", "setting of speech production model", and "setting of output method". In this case, "setting of language", "setting of speech production model", and "setting of output method" are stored in the memory 42 of the image forming apparatus 12 in association with the identification information. The processor 41 of the image forming apparatus 12 may acquire the identification information from the two-dimensional code 52, may read the settings associated with the acquired identification information from the memory 42, and may execute the processing such as the OCR processing, the machine translation processing, the printing processing, and the speech synthesis processing.

In addition, the settings such as "setting of language", "setting of speech production model", and "setting of output method" may be stored to another recording medium instead of converting the settings into the two-dimensional code 52 and printing (saving) the two-dimensional code 52 on a paper medium. For example, the settings such as "setting of language", "setting of speech production model", and "setting of output method" may be stored to an information processing terminal such as an IC card or a smartphone. In this case, the image forming apparatus 12 includes a wireless communication unit that communicates with the information processing terminal such as an IC card or a smartphone. The image forming apparatus 12 may set "setting of language", "setting of speech production model", "setting of output method" and the like based on information acquired from the information processing terminal such as an IC card or a smartphone by the wireless communication unit.

While certain embodiments have been described these embodiments have been presented by way of example only, and are not intended to limit the scope of the disclosure. Indeed, the novel embodiments described herein may be embodied in a variety of other forms: furthermore various omissions, substitutions and changes in the form of the embodiments described herein may be made without departing from the spirit of the inventions. The accompanying claims and their equivalents are intended to cover such embodiments or modifications as would fall within the scope and spirit of the disclosure.

What is claimed is:

1. An image forming apparatus comprising:
an image forming unit configured to print image data on a medium;
a machine translation processor configured to acquire translated text data, the translated text data being a result of machine translation processing based on untranslated text data, the untranslated text data being generated from a scanned document image through optical character recognition (OCR) processing;
a speech synthesis processor configured to generate speech data based on the translated text data; and
a processor configured to:
determine whether to execute printing or to generate speech data based on a preset setting of an output method,
when executing printing, generate translation document image data based on the translated text data and the document image, and control the image forming unit to print the translation document image data, and when generating speech data, control the speech synthesis processor to execute speech synthesis processing of generating speech data based on the translated text data.

2. The apparatus according to claim 1, further comprising a speech output configured to output a speech based on the speech data,
wherein the setting of the output method further indicates whether to transmit the speech data by e-mail, to store the speech data to a recording medium, or to control the speech output to output the speech data,
wherein the processor is configured to transmit the speech data by e-mail, store the speech data to a recording medium, or control the speech output to output the speech data based on the setting of the output method.

3. The apparatus according to claim 2, wherein the speech output includes a speaker.

4. The apparatus according to claim 2,
wherein the processor is configured to determine a speech production model used for the speech synthesis processing based on a preset setting of a speech production model.

5. The apparatus according to claim 4, wherein the speech production model includes a male or a female voice.

6. The apparatus according to claim 1, wherein the output method includes a plurality of different output methods.

7. The apparatus according to claim 1, wherein the output method includes at least one of Braille or a sign language animation.

8. The apparatus according to claim 1,
wherein the processor is configured to:
store the setting of the output method to a recording medium, and
set the setting of the output method based on information acquired from the recording medium.

9. A control method for an image forming apparatus including an image forming unit configured to print image data on a medium and including a processor, the control method controlling the processor to execute functions comprising:
acquiring translated text data as a result of machine translation processing based on untranslated text data, the untranslated text data being generated from a scanned document image through optical character recognition (OCR) processing;
determining whether to execute printing or to generate speech data based on a preset setting of an output method;
generating translation document image data based on the translated text data and the document image, and controlling the image forming unit to print the translation document image data when executing printing; and
executing speech synthesis processing of generating speech data based on the translated text data when speech data is generated.

10. The method of claim 9, wherein the setting of the output method further indicates whether to transmit the speech data by e-mail, to store the speech data to a recording medium, or to control the speech output to output the speech data,
the method further comprising
transmitting the speech data by e-mail, storing the speech data to a recording medium, or controlling the speech output to output the speech data based on the setting of the output method.

11. The method of claim 10, further comprising determining a speech production model used for the speech synthesis processing based on a preset setting of a speech production model.

12. The method of claim 10, further comprising:
storing the setting of the output method to a recording medium, and
setting the setting of the output method based on information acquired from the recording medium.

13. A non-transitory computer readable medium storing instructions for a control method for an image forming apparatus including an image forming unit configured to print image data on a medium and including a processor, the instructions when executed, performing the control method controlling the processor to execute functions comprising:
acquiring translated text data as a result of machine translation processing based on untranslated text data, the untranslated text data being generated from a scanned document image through optical character recognition (OCR) processing;
determining whether to execute printing or to generate speech data based on a preset setting of an output method;
generating translation document image data based on the translated text data and the document image, and controlling the image forming unit to print the translation document image data when executing printing; and
executing speech synthesis processing of generating speech data based on the translated text data when speech data is generated.

14. The computer readable medium of claim 13, wherein the setting of the output method further indicates whether to transmit the speech data by e-mail, to store the speech data to a recording medium, or to control the speech output to output the speech data,
the method further comprising
transmitting the speech data by e-mail, storing the speech data to a recording medium, or controlling the speech output to output the speech data based on the setting of the output method.

15. The computer readable medium of claim 14, wherein the method further comprises determining a speech production model used for the speech synthesis processing based on a preset setting of a speech production model.

16. The computer readable medium of claim 14, the method further comprising:
storing the setting of the output method to a recording medium, and
setting the setting of the output method based on information acquired from the recording medium.

* * * * *